(12) United States Patent
Perrin et al.

(10) Patent No.: US 7,255,192 B2
(45) Date of Patent: Aug. 14, 2007

(54) ACTUATED TETHER

(75) Inventors: Douglas P. Perrin, Cambridge, MA (US); Robert D Howe, Cambridge, MA (US)

(73) Assignee: President and Fellows of Harvard College, Cambridge, MA (US)

(*) Notice: Subject to any disclaimer, the term of this patent is extended or adjusted under 35 U.S.C. 154(b) by 253 days.

(21) Appl. No.: 10/973,622

(22) Filed: Oct. 26, 2004

(65) Prior Publication Data

US 2006/0097682 A1    May 11, 2006

(51) Int. Cl.
*F04B 39/00* (2006.01)
(52) U.S. Cl. .................. 180/305; 417/572
(58) Field of Classification Search .......... 180/305; 15/240, 1.7; 700/245; 417/76, 98, 204, 417/572
See application file for complete search history.

(56) References Cited

U.S. PATENT DOCUMENTS

| | | | | |
|---|---|---|---|---|
| 3,689,408 | A * | 9/1972 | Edmiston et al. | 210/169 |
| 4,023,227 | A * | 5/1977 | Chauvier | 15/1.7 |
| 4,862,808 | A | 9/1989 | Hedgcoxe | |
| 5,706,540 | A * | 1/1998 | Niewiarowski | 15/1.7 |
| 5,794,293 | A * | 8/1998 | Hoffinger | 15/1.7 |
| 6,039,886 | A * | 3/2000 | Henkin et al. | 210/776 |
| 6,125,492 | A * | 10/2000 | Prowse | 15/1.7 |
| 6,298,513 | B1 * | 10/2001 | Rief et al. | 15/1.7 |
| 6,662,394 | B2 | 12/2003 | Balint | |
| 6,697,710 | B2 | 2/2004 | Wilcox | |
| 6,966,092 | B2 * | 11/2005 | Sebor | 15/1.7 |
| 7,039,980 | B2 * | 5/2006 | Van Der Meyden et al. | 15/1.7 |
| 2002/0129839 | A1 * | 9/2002 | Erlich et al. | |

OTHER PUBLICATIONS

J. Casper and R.R. Murphy, "Human-Robot Interactions during the Robot-Assisted Urban Search and Rescue Response at the World Trade Center," IEEE Transactions on Systems, Man and Cybernetics Part B, vol. 33, No. 3, pp. 367-385, Jun. 2003.
J. Carlson and R.R. Murphy, "How UGV's Physically Fail in the Field," www.crasar.csee.usf.edu/research/Publications/CRASAR-TR2004-16.PDF.

(Continued)

*Primary Examiner*—Christopher Bottorff
(74) *Attorney, Agent, or Firm*—24IP Law Group USA; Timothy R. DeWitt (57) ABSTRACT

A self-actuating robot or vehicle tether capable of moving itself, remaining free while traversing around obstacles, and free itself is disclosed. In a preferred embodiment of the invention, a valve is mounted to the tether or robot. An inflow conduit attached to or in the tether is connected to the valve. A fluid flows through the tether and the valve is opened and closed to create a waterhammer effect in the inflow conduit. The forces created on the tether from the waterhammer effect result in motion of the tether and in freeing of the tether from obstructions. Closing and opening the valve further creates pressure changes in the tether, thereby causing momentary dimensional changes in the tether. In an alternative embodiment, a plurality of valves are placed along the tether. Pulsing of the plurality of valves while a fluid flows through the tether results in the tether effectively moving itself.

24 Claims, 9 Drawing Sheets

OTHER PUBLICATIONS

R. Murphy, "Human-Robot Interaction in Rescue Robotics," IEEE Systems, Man and Cybernetics Part C: Applications and Reviews, special issue on Human-Robot Interaction, vol. 34, No. 2, May 2004.

J. Carlson, R. Murphy, and A. Nelson, "Follow-up Analysis of Robot Failures," IEEE International Conference on Robotics and Automation (ICRA), Apr. 2004.

R. Murphy, "Rescue Robotics for Homeland Security," Communications of the ACM, vol. 47, No. 3, Mar. 2004.

J. Burke, R. Murphy, E. Rogers, V. Lumelsky, and J. Scholtz, "Final Report for the DARPA/NSF Interdisciplinary Study on Human-Robot Interaction."

* cited by examiner

ACTUATED TETHER

STATEMENT REGARDING FEDERALLY SPONSORED RESEARCH OR DEVELOPMENT

The present invention was developed in connection with funding under National Science Foundation contract no. ISS-009988575 and Office of Naval Research contract no. N00014-98-1-0669.

CROSS-REFERENCE TO RELATED APPLICATIONS

None.

BACKGROUND OF THE INVENTION

1. Field of the Invention

The present invention relates to mobile tethers providing a physical connection between two locations. More specifically, the present invention relates to a system and method for providing an actuated tether capable of moving itself, remaining free while traversing around obstacles, and/or freeing itself when pinned by debris or restrained by obstacles.

2. Description of the Related Art

A longstanding goal of mobile robotics is to allow robots to work in hazardous or inaccessible environments. Post-disaster urban search and rescue is one of the most hazardous environments imaginable, and victims are often in unreachable locations buried beneath unstable rubble. The goal of rescue robotics is to extend the capabilities of human rescuers while also increasing their safety. Robots can enter voids too small or deep for humans and can survey larger voids that humans are not permitted to enter until, for example, a fire has been put out or a structure has been reinforced. They can carry various types of equipment, such as thermal imagers, cameras, hazardous materials sensors, medical supplies, or even food and water into the interior of a rubble pile far beyond where searchers may otherwise reach, such as with a boroscope.

In practice, however, rescue robots have encountered a number of difficulties involving radio transmission inefficiency, poor maneuverability, and tethers becoming caught. Numerous publications have discussed experiences with rescue robots at actual disaster sites. One such publication is "Human-Robot Interactions during the Robot-Assisted Urban Search and Rescue Response at the World Trade Center," Casper, J., and Murphy, R. R., *IEEE Transactions on Systems, Man and Cybernetics Part B*, Vol. 33, No. 3, pp. 367-385, June 2003, which is hereby incorporated by reference in its entirety.

Rescue robots may come in many forms and varieties. Robots likewise may be polymorphic, meaning that the robot's effectors (components that perform actuation and any connections relating to those components) may be dynamically changed to fit the environment. Some examples of existing robots are listed Table I in "How UGVs Physically Fail in the Field," Carlson, J., and Murphy, R. R., submitted *IEEE Transactions on Robotics* for publication and publicly available at crasar.csee.usf.edu/research/Publications/CRASAR-TR2004-16.pdf, which is hereby incorporated by reference in its entirety. The robots may be of a variety of different sizes, may use different means of locomotion, may use different types of power, may have different modes of control, may incorporate different tools or equipment, and may have different modes of communication.

Some examples of robot types and features are described in "Human-Robot Interaction in Rescue Robotics," Murphy, R., *IEEE Systems, Man and Cybernetics Part C: Applications and Reviews, special issue on Human-Robot Interaction*, Vol. 34, No. 2, May 2004, which is hereby incorporated by reference in its entirety.

In many environments in which rescue robots may be needed, however, the most useful robot size is about the dimensions of a shoebox. This limitation in size can preclude use of certain types of controls that, for example, may require multiple sensors, certain types of power such as batteries, or certain means of locomotion.

Reliability of the rescue robots obviously is an important issue. Rescue robots can fail for a wide variety of reasons. Examples of rescue robot failures are described and discussed in the previously referenced articles and in other published articles such as "Follow-up Analysis of Mobile Robot Failures," J. Carlson, R. Murphy, A. Nelson, *IEEE International Conference on Robotics and Automation (ICRA)*, April 2004, which is hereby incorporated by reference in its entirety.

Communication has been a large issue with respect to rescue robots. Wireless robots typically are larger and more mobile than tethered robots, but they still require a safety line and communication are easily lost in the harsh environment in which they are used. For example, following the World Trade Center disaster on Sep. 11, 2001, a communication failure caused the temporary loss of an untethered, teleoperated robot. As such a disaster site, usable communication frequencies are very limited because most frequencies are reserved for emergency response agents. Additionally, thick concrete walls and steel debris often obstruct radio communication between the operator and the robot. These communications difficulties often make tethered robots more reliable and useful than untethered robots in this kind of environment.

Tethered robots additionally may be much smaller than their untethered counterparts due to the elimination of batteries and wireless communications equipment. A smaller size allows tethered robots to search areas that would be inaccessible by larger robots.

Lack of mobility also can hinder robotic search and rescue efforts. For example, it is often beneficial to deploy robots through holes or vertical pipes. Tethers are beneficial in these situations as tethered robots can be safely lowered or raised vertically. Additionally, in the event of a robot malfunction, tethers may be used for robot recovery.

Drawbacks of using conventional tethers include increased drag and a tendency to catch on obstacles. Conventional tethers therefore may limit the depth and path of exploration. The use of tethers also requires an additional operator to handle the tether. This operator attempts to avoid breaking or locking the tether on debris as the robot moves into the site. Tether managers, of course, are at risk since they often work close to structures with questionable stability during the deployment.

Many of these issues also pertain to other applications of remotely controlled vehicles in inaccessible or hazardous locations. For example, vehicles for pipe inspection and repair or military operations in trenches and caves encounter similar problems with communications and tether management. Examples of such other applications are disclosed in U.S. Pat. Nos. 6,697,710 and 4,862,808, which are hereby incorporated by reference in their entirety. The present invention described below is equally applicable to these other applications in addition the field of rescue robots.

SUMMARY OF THE INVENTION

The present invention disclosed and claimed herein is a novel solution to the problem of tether management, allowing search and rescue teams to take advantage of the benefits of tethered robots while significantly reducing difficulties associated with traversing corners catching on obstacles. The invention involves creating a rapid momentum transfer in the tether to create inertial forces to overcome friction. In a preferred embodiment of the invention, a fluid flows through a hose within a tether and a valve is repeatedly closed and opened to create a waterhammer effect in the tether. Another preferred embodiment comprises creating a rapid momentum transfer in the tether or something attached to the tether by moving a mass such as a piston forward and then stopping it.

A preferred embodiment of the invention comprises a tethered vehicle or robot having a body, a means of locomotion, and a tether system comprising a hose and a valve, wherein the hose is connected to an entrance port in the valve and wherein closing and opening of the valve while a fluid travels through the first hose produces a waterhammer effect. A second hose or other means of disposal of the fluid may be connected to an outflow port of the valve. The first and second hoses may be within the tether or may be attached to the robot tether.

Another embodiment of the invention comprises a method for freeing a tether comprising the steps of supplying a flowing fluid through the tether and through and open valve on or near the robot, and closing the valve to generate a waterhammer effect in the robot tether.

Another embodiment of the invention comprises a tether having an inflow hose or conduit for a fluid traveling along the hose and a plurality of valves connected along the inflow hose. The plurality of valves along the inflow hose are opened and closed, such as in a pulsing manner. The pulsing of the plurality of valves on the inflow hose may generate movement of the tether, thereby enabling a very small, low power or "no power" vehicle or robot having no separate means of locomotion to move while being connected to a long, heavy tether.

Still other aspects, features, and advantages of the present invention are readily apparent from the following detailed description, simply by illustrating preferable embodiments and implementations. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRITION OF THE DRAWINGS

The accompanying drawings, which are incorporated in and constitute a part of this specification illustrate some embodiments of the invention and, together with the description, serve to explain some aspects, advantages, and principles of the invention. In the drawings.

FIGS. 10$a$ and $b$ are graphs of the normal force between tether and floor for the valve opening and closing in a mass-pinning configuration of one of the Examples of the invention.

FIGS. 11$a$ and $b$ are graphs of the normal and tangential force measurements in a mass-pinning configuration of one of the Examples of the invention.

FIGS. 12$a$ and $b$ are free body diagrams for the tether and mass in a mass-pinning Example of the invention.

DETAILED DESCRIPTION OF THE INVENTION

The present invention provides a novel solution to the problem of tether management. More specifically, the invention relates to the use of a rapid momentum transfer in a tether or item connected to a tether to create inertial forces that overcome friction and result in movement of the tether.

A preferred embodiment of the invention involves flowing a fluid through a conduit, hose or tube within a tether and repeatedly closing a valve or valves on the hose. When a valve closes, momentum of the flowing fluid is transferred to the valve and hose. Depending on the specific embodiment, the valve closure also may result in a momentary local or global change in diameter or length of the hose.

When a flow of fluid through a conduit, hose, pipe or tube is suddenly stopped due to the sudden closure of a valve, the momentum of the fluid that was in motion applies a force on the parts of the system that are at rest, causing a substantial increase in pressure. This effect propagates back from the valve in the form of a pressure wave traveling opposite the flow direction, an effect commonly referred to as a "hydraulic transient" or "waterhammer." Although the term "waterhammer" is used throughout this description, it will be understood that the invention similarly may be used with fluids other than water and the term "waterhammer" as used herein is intended to encompass the effect regardless of what type of fluid is used in the system. Other fluids that may be used include but are not limited to oil, hydraulic fluid, and air.

Waterhammer is a significant problem in hydraulic and civil engineering, where the induced pressure wave produces enormous forces and can cause serious damage to rigid pipe systems. There has been considerable research into this phenomenon, with the focus of minimizing the waterhammer effect. For example, the waterhammer effect is described in J. Parkman, *Waterhammer Analysis*, Dover Publications, New York, N.Y., 1963, and R. Gregory and M. Paidoussis, "Unstable oscillation of tubular cantilevers conveying fluid," *Proceedings of the Royal Society of London, Series A, Mathematical and Physical Sciences*, 293(1435): 512-527 (1966), which are hereby incorporated by reference. The present invention involves the exact opposite of conventional wisdom: deliberately creating and using a waterhammer effect in flexible tubing.

A preferred embodiment of the present invention utilizes the waterhammer effect to create an actuated tether. The waterhammer effect in the tether results in a number of different mechanisms that may contribute to movement of the tether in different situations. Such mechanisms may include, but are not limited to, a transfer of momentum from the fluid to the tether, changes in the diameter of the tether, and changes in the length of the tether. Which of these mechanisms contribute to movement of the tether depends upon the particular embodiment and the particular circumstances.

A preferred embodiment is described in the context of a tethered robot, but it should be understood that the invention is not limited to use with tethered robots. Rather, the invention may be used with any item, device, robot or vehicle connected to the end of a tether provided that some mechanism for steering or guiding the tether is provided.

A typical tethered robot has a housing or body and a means for locomotion. The housing and means for locomotion may be of any known or future developed form, such as wheels, tractor treads, legs, or serpentine. The housing may be an integral component or may be a combination of other components.

Figure 1:
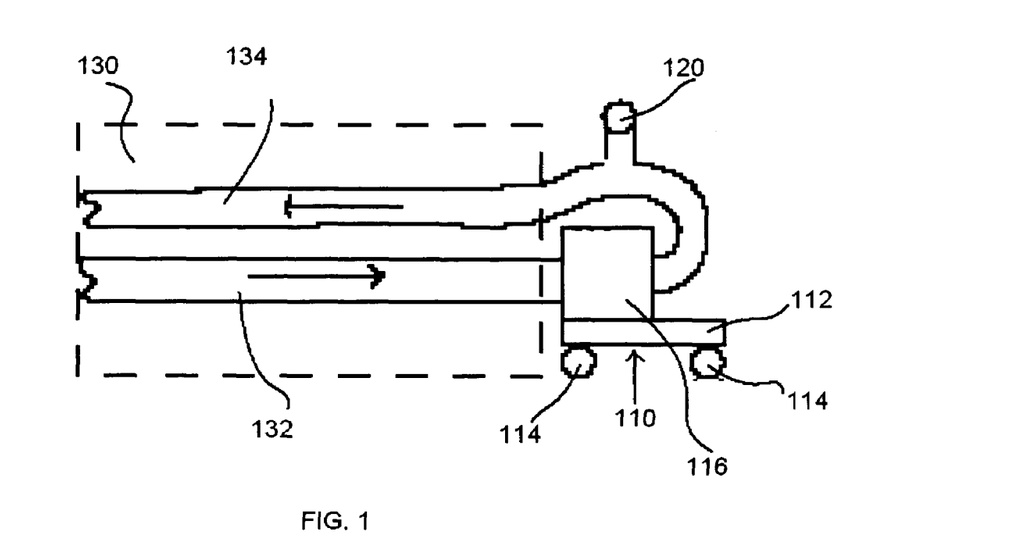
FIG. 1 is a block diagram of a tether design in accordance with an embodiment of the present invention.

In a preferred embodiment of the invention, shown in FIG. 1, a mobile robot 110 has a housing or body 112, a means for locomotion including wheels 114 and a means for driving the wheels such as an electric motor (not shown), an electric solenoid valve 116, an air bleed 120 and a tether 130. A robot tether may include many different components such are wires or cables for communications or fiber-optics for transmitting video images.

Although an electric solenoid valve is described in this embodiment, many other types of valves are known and may be used in the invention. Thus, the invention is not limited to solenoid valves.

Likewise, many alternatives exist with respect to the air bleed valve 120. The air bleed valve 120 is a means for reducing or minimizing reciprocal hydraulic transients or waterhammer effects. Other means for reducing or minimizing the reciprocal effects are known and may be used in place of or in addition to the air bleed valve. Such other known means include, but are not limited to accumulation tanks partially filled with a compressible fluid and dampers.

Typically, controls (not shown) for the robot are connected to an end of the tether opposite the robot. In a preferred embodiment of the invention, the electronic solenoid valve 116 is controllable from the user controls. The controls for the solenoid valve may be of any type, such as simple open/close controls or more complicated controls permitting pulsing of the valve or adjusting pulsing rate of the valve. The mobile robot may be of any tethered type or model and the present invention may be used together with any other components that may be included in a robot tether.

Figure 13:
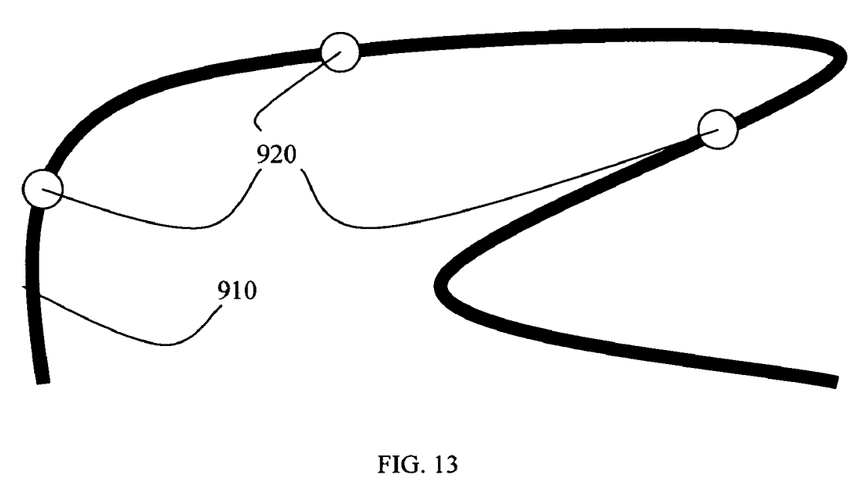
FIG. 13 is a diagram of a tether having a plurality of valves according to an embodiment of the invention.

While only one solenoid valve 116 is provided in this embodiment, it should be understood that a plurality of valves placed along the tether may be preferred over a single valve. Likewise, while the Examples of the invention described below convey results of testing a robot tether having a single valve, a plurality of valves 920 may be placed along the tether 910 as shown in FIG. 13 such that opening and closing of the plurality of valves result in movement of the tether. With such an arrangement, the actuated tether may effectively move itself, thereby permitting its use with robots, vehicles or other devices lacking sufficient locomotive power to drag the tether.

Referring again to FIG. 1, the tether 130 has an inlet hose or tube 132 and a return or outlet hose or tube 134. The inlet hose 132 is connected to a pressurized source of water (not shown) or other fluid and the outlet hose is connected to a means for disposing or reusing the fluid (not shown). While water is used in the preferred embodiment, other fluids may be used, as noted above. The pressurized source of water or other fluid may be of any sufficient form for the particular robot used, such as from a pump or faucet. Further, although the inflow and outflow tubes are described here as being within the tether, it should be understood that they could be attached to the outside of the tether, for example, such as in a retrofit of an existing tethered robot. Moreover, the outlet tube may be of different length than the inflow tube and even may be eliminated, depending on the fluid used, the particular environment, and the particulars of the robot, vehicle or other device connected to the tether. For example, if air is being used as the fluid, the return hose could be eliminated altogether. Further, a fluid such as water could be disposed of in any location in which it would not adversely affect the robot, vehicle, or other device connected to the tether or anything in the environment.

The solenoid valve 116 controls the flow of fluid through the tether. While a solenoid valve is used here, other types of valves may be used. The air bleed valve 120 prevents an inverse waterhammer wave in the return line and therefore minimizes motion for the return line. In this preferred embodiment, the air bleed valve 120 is connected to the outlet of the solenoid valve 116, but it may be located elsewhere provided that it is located on the outflow side of the solenoid valve 116. The air bleed valve 120 allows a one-way flow of air into the tether without the flow of fluid out of the tether. As with the solenoid valve, a plurality of air bleed valves may be used depending on the number and placement of solenoid valves along the tether. In such an embodiment, the plurality of air bleed valves would be located on the outflow sides of the various solenoid valves. When the solenoid valve 116 closes, the air bleed valve 120 allows air into the outlet or return hose 134 to prevent rapid deceleration of the fluid in the outlet or return hose.

It should be understood that the actuated tether may be used in any circumstance in which such actuation will assist in freeing a tether or in the locomotion of the tether. The actuated tether may be used as the primary means of locomotion of the tether and whatever may be attached to the tether in the particular circumstance. In other embodiments, the valve or valves in the tether may be pulsed, thereby creating movement of the tether during free movement of the robot. Such pulsing in a tether having a plurality of valves placed along the tether may enable a small, low-power robot, vehicle, or other device to be used with or drag a long and/or heavy tether. The invention likewise could be used with robots, vehicles, or devices having no independent means of locomotion. Such an embodiment preferably would have some type of steering or guiding mechanism at or in the vicinity of the end of the tether. The steering mechanism may be part of a robot (wheels, treads, legs, etc.), part of a vehicle, part of some other mobile device, or a standalone steering mechanism.

Some of the benefits or advantages of the self-actuated tether invention can be seen from the following examples. The examples demonstrate the ability of the actuated tether to permit tethered robots, vehicles or other devices to move in situations in which they have no other means of locomotion or their primary means of locomotion is unable to propel it.

EXAMPLE 1

Figure 2:
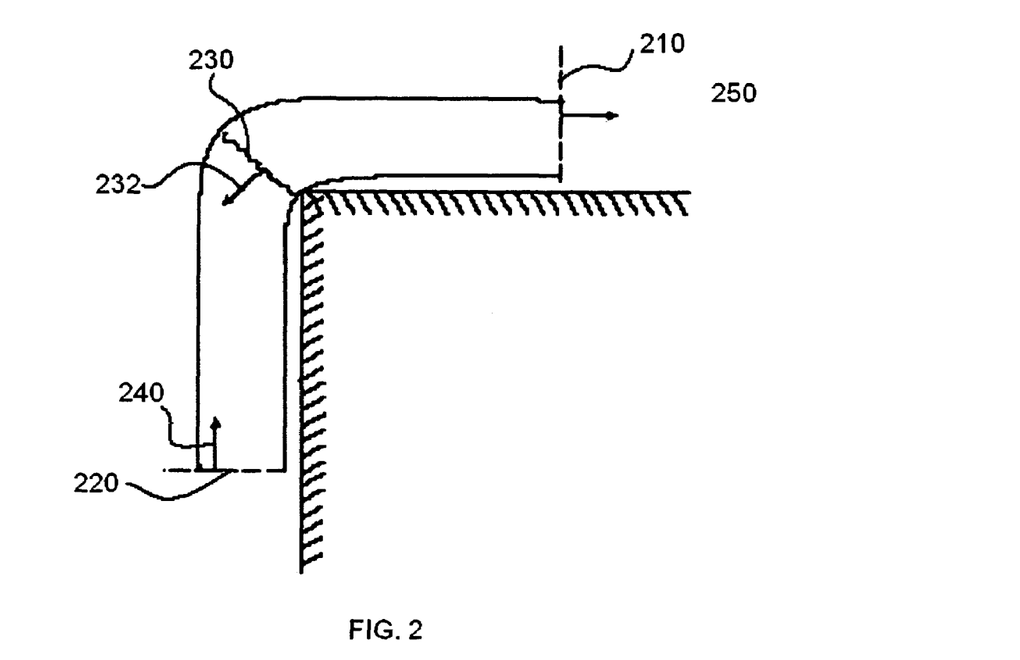
FIG. 2 is an illustration of a robot tether caught on a corner as discussed in the Examples of the invention.
Figure 3:
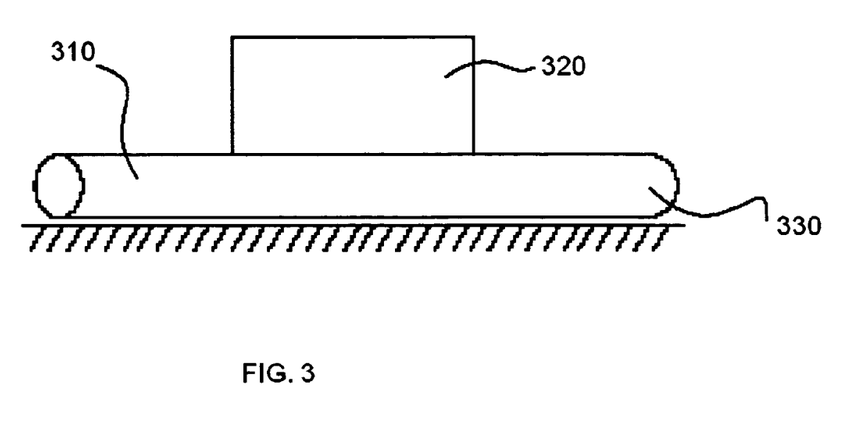
FIG. 3 is an illustration of a robot tether pinned under a mass as discussed in the Examples of the invention.

The first example is referred to as a robot drag test. The robot-tether system in this example consisted of a 1.27 cm internal diameter (ID), 1.91 cm outer diameter (OD), nylon reinforced, flexible vinyl hose; a solenoid valve (Type 18AR43, normally open, Magnatrol ValveCorp., Hawthorne, N.J.) to control the fluid flow; and a model car to simulate a robot or other tethered vehicle. The model car used was capable of pulling with up to 8 N of force without wheel slip on the surface tested. Water was provided from a sink tap at a volumetric flow rate of $2.9 \times 10^{-4}$ m$^3$/s and velocity of 2.3 m/s when the valve was open. The valve switch was manually pulsed at a low frequency of approximately 3 Hz. The system was tested in two representative situations where the unactuated tether was stuck: the first was where the tether was caught on a corner such as is shown in FIG. 2 and the second was where the tether was pinned under and external weight such as is shown in FIG. 3. The test cases were designed so that the vehicle was unable to move forward under its own power with the tether unactuated. The test was considered a success if the vehicle could move forward only when the tether was operated.

To test the efficacy of the actuated tether, the robot was positioned so the tether was caught around a corner and underneath a door. In this configuration, the frictional force on the unactuated tether was sufficient so the vehicle could not move. When the valve was repeatedly pulsed, the vehicle was able to pull forward with each jerk. Another drag test shows the robot's ability to provide motion with the tether pinned under an additional weight. With the vehicle and the tether in a line, a weight of 6 kg was placed on top of the tether. Again, the vehicle was unable to move forward on its own. With the tether engaged, the vehicle was able to pull forward despite the additional burden.

EXAMPLE 2

Figure 4:
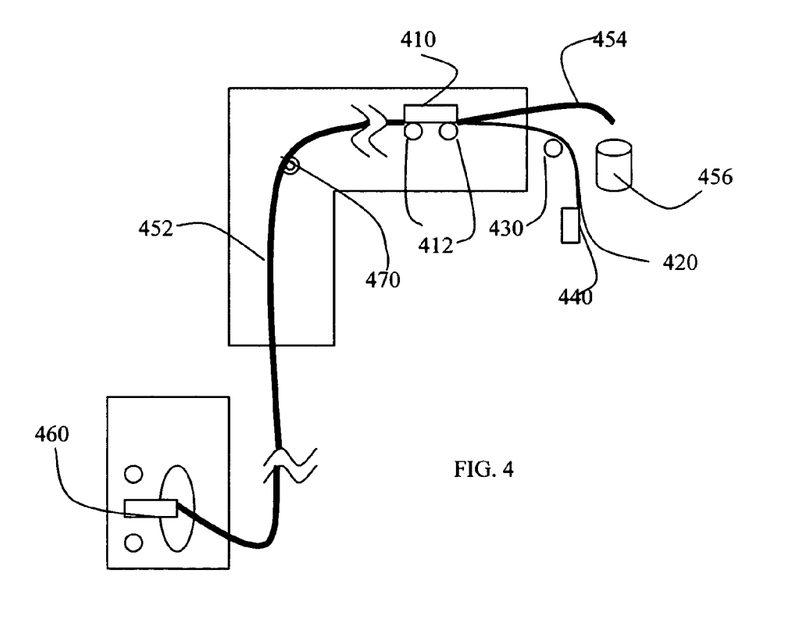
FIG. 4 is an illustration of a test system in accordance with one of the Examples of the invention.

The second and third examples may be referred to as direct force measurements. For the direct force measurements, a solenoid valve (Series 7122, normally open, Parker, New Britain, Conn.) was placed on a small platform 410 with castors 412. The valve had an approximate closing time of 15 ms. A string 420 over a pulley 430 was used to apply a known forward force to the valve. The hose 450 was a 6.35 mm ID, 9.53 OD PVC hose, with an inflow length 452 of 9.4 m and an outflow length 454 of 2.2 m. Water was provided from a sink tap 460 at a volumetric flow rate of $7.0 \times 10^{-5}$ m$^3$/s for a velocity of 2.2 m/s when the valve was open. The outflow from the outflow length of hose was directed into outflow catch 456. Force data was collected using a force sensor 470 (Gamma model, ATI Inc., Apex, N.C.) at a sampling rate of 1000 Hz with a resolution of 10 counts per Newton and an error of +/−0.15N. The schematic for the corner measurement is shown in FIG. 4. With this arrangement shown in FIG. 4, data was collected with various tensions where the tether was caught on the corner.

Figure 5:
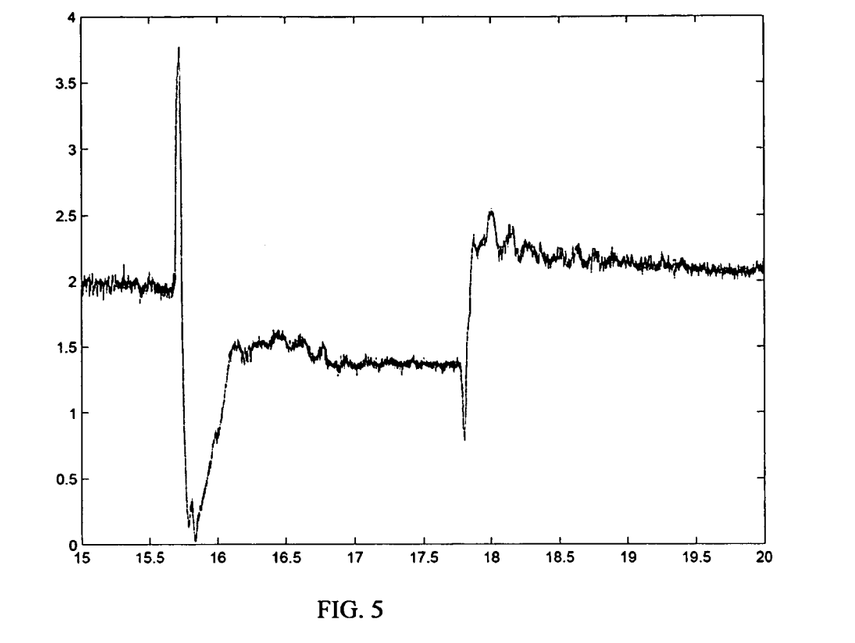
FIG. 5 is a graph showing force measurements from one of the Examples of the invention.

Force measurements for closing and opening are shown in FIG. 5 for a free hose with a tension of 3.9 N. As the valve is closed at 15.7 s, the magnitude of the contact force at the corner increases and then decreases to near zero. The reduction in contact force reduces the necessary tension to allow movement of the platform. A tension of 3.9 N is not sufficient to pull the platform under the corner locking configuration, however, with the reduction in contact force due to the waterhammer effect, a tension of 3.9 N provides considerable forward motion of the platform (2.5 cm/pulse). A tension as low as 1.0 N provides slight motion of the platform when the valve is pulsed under corner locking, even though this tension cannot provide motion for a straight tether that does not curve around a corner.

EXAMPLE 3

Figure 6:
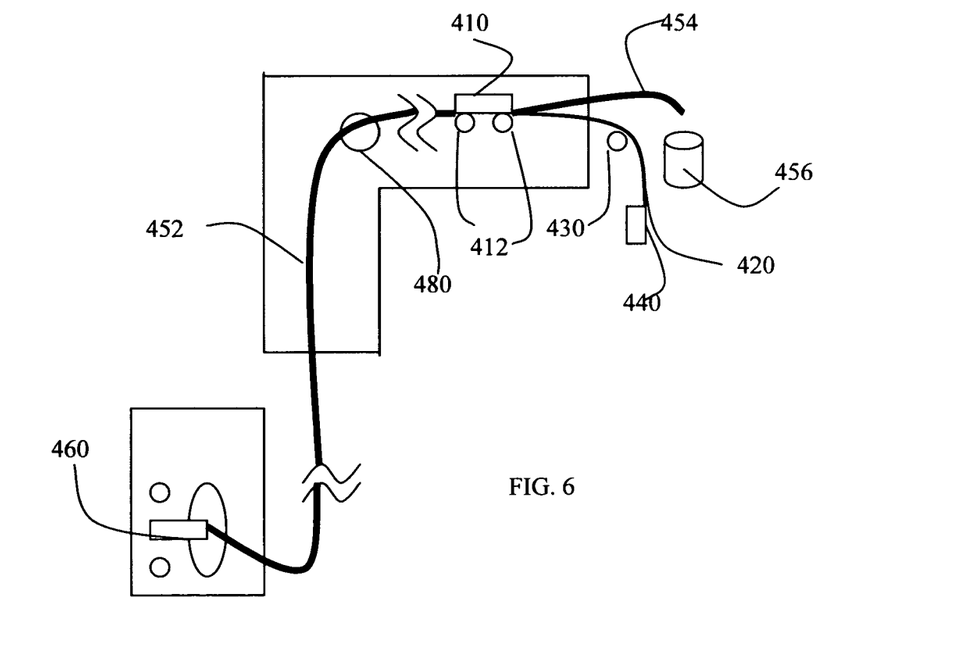
FIG. 6 is an illustration of a test system in accordance with one of the Examples of the invention.
Figure 7:
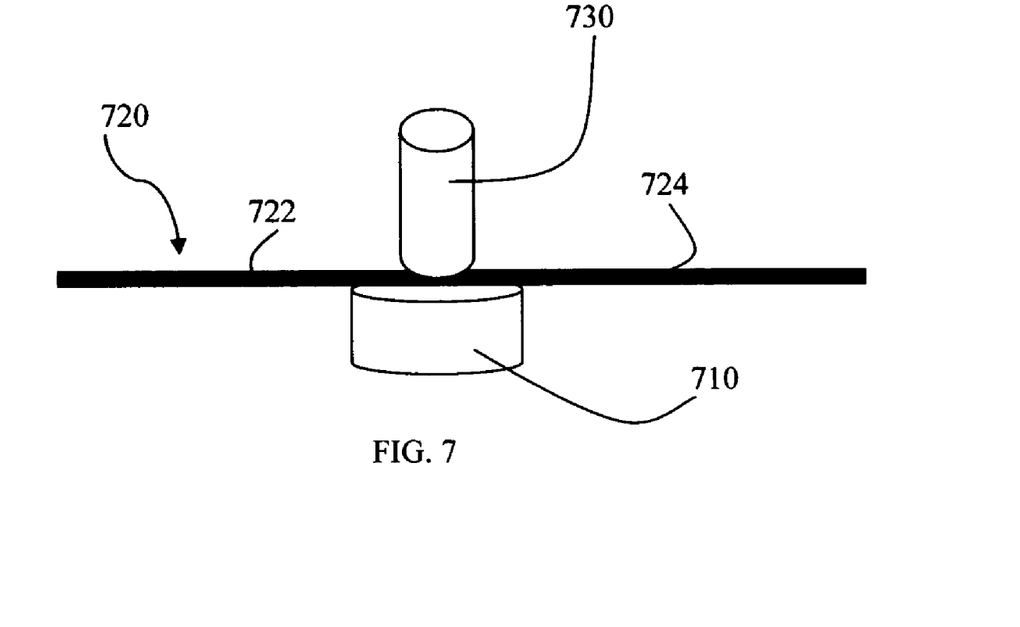
FIG. 7 is a further illustration of a test system in accordance with one of the Examples of the invention.
Figure 8:
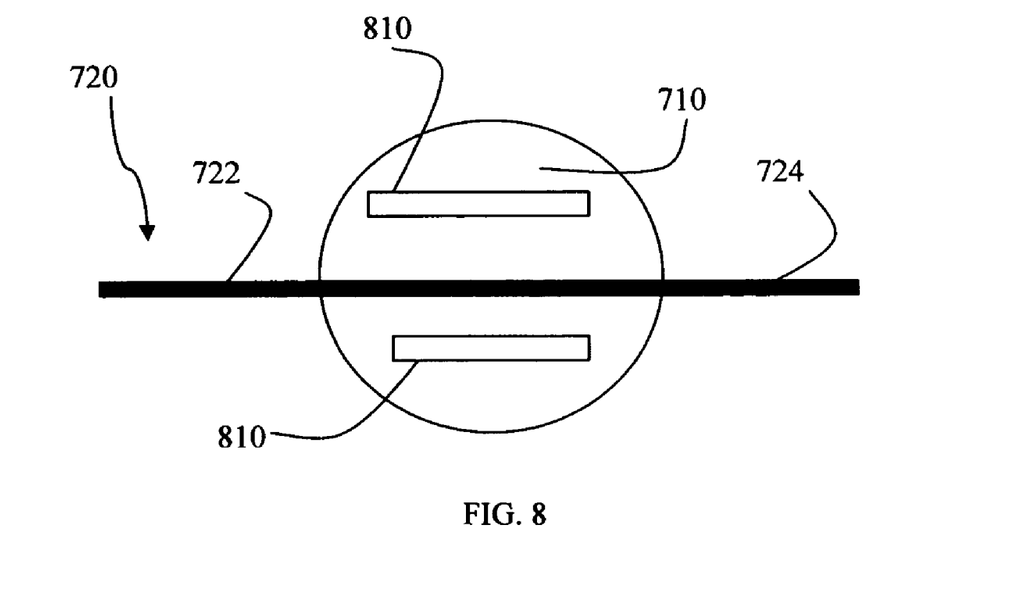
FIG. 8 is a further illustration of a test system in accordance with one of the Examples of the invention.
Figure 9:
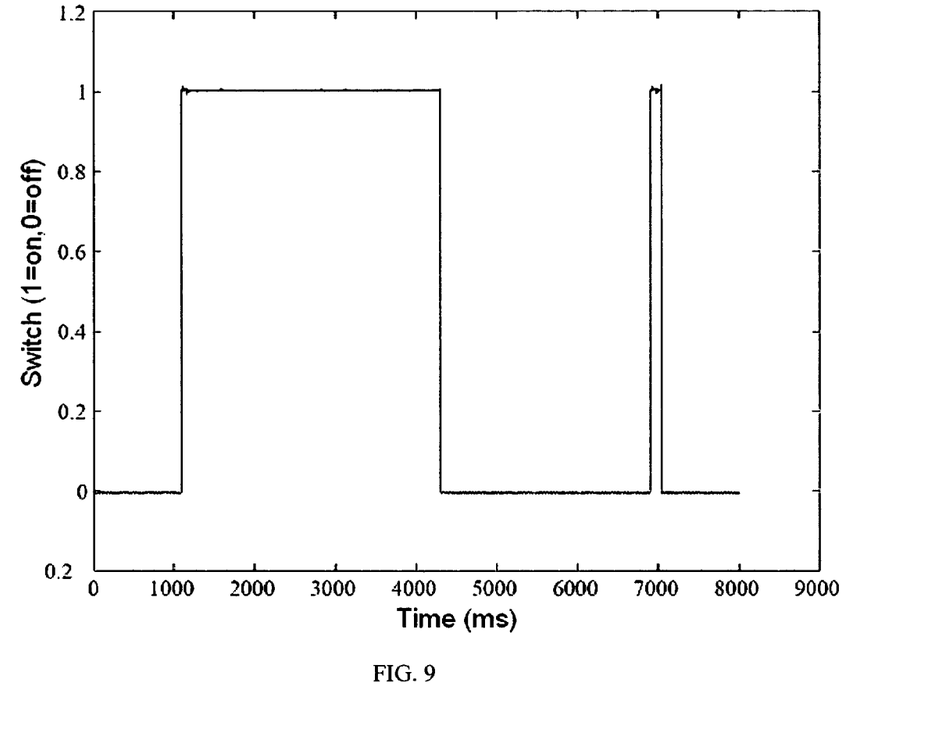
FIG. 9 is a graph of a valve control signal in accordance with an embodiment of the invention.

The third example is another direct force measurement, but with the test system of FIG. 4 being modified as shown in FIG. 6. Specifically, the force sensor 470 was removed and replaced with force sensor 480. The setup of force sensor 480 is shown in FIGS. 7 and 8. The hose 720 was placed on a force sensor 710. To stabilize the mass on the tether, small piece of hose 810 was mounted on the force sensor on each side of the tether. A mass 730 was then placed on the tether, thereby pinning the tether 720 to the force sensor 710. The direction of water flow in the tether 720 was from inflow 722 toward outflow 724. The force the tether exerted on the floor was measured for different masses. For both configurations the force needed to provide motion of the platform was 3.9 N when not in a locking configuration. Data was collected for valve closing, opening, and rapid closing and then opening, or pulsing. An example of a valve control signal is shown in FIG. 9, where the valve is closed at 1150 ms, opened at 4200 ms, and pulsed at 6950 ms.

Figure 10A:
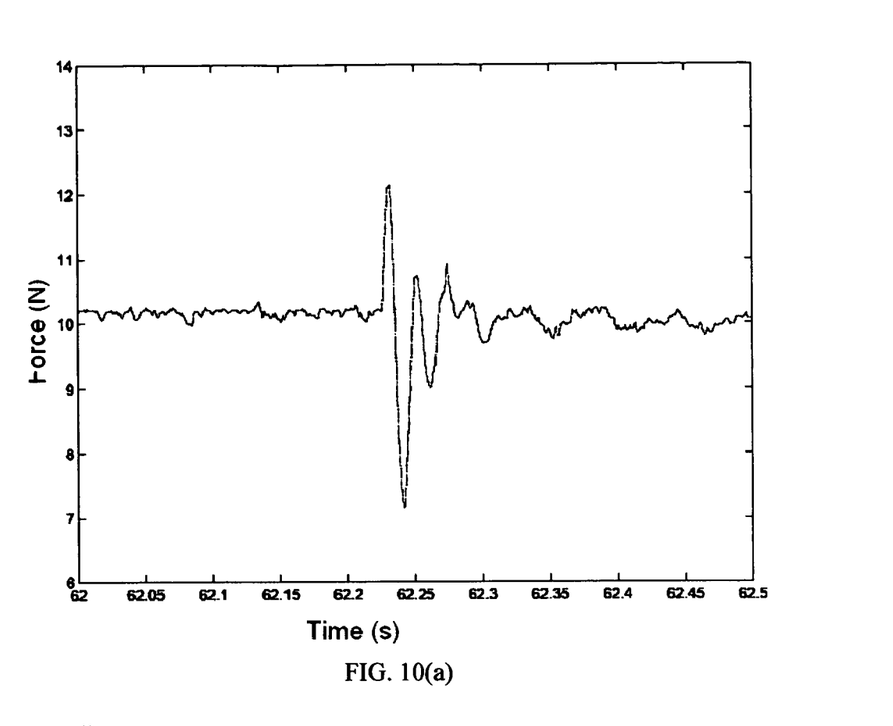
Figure 10B:
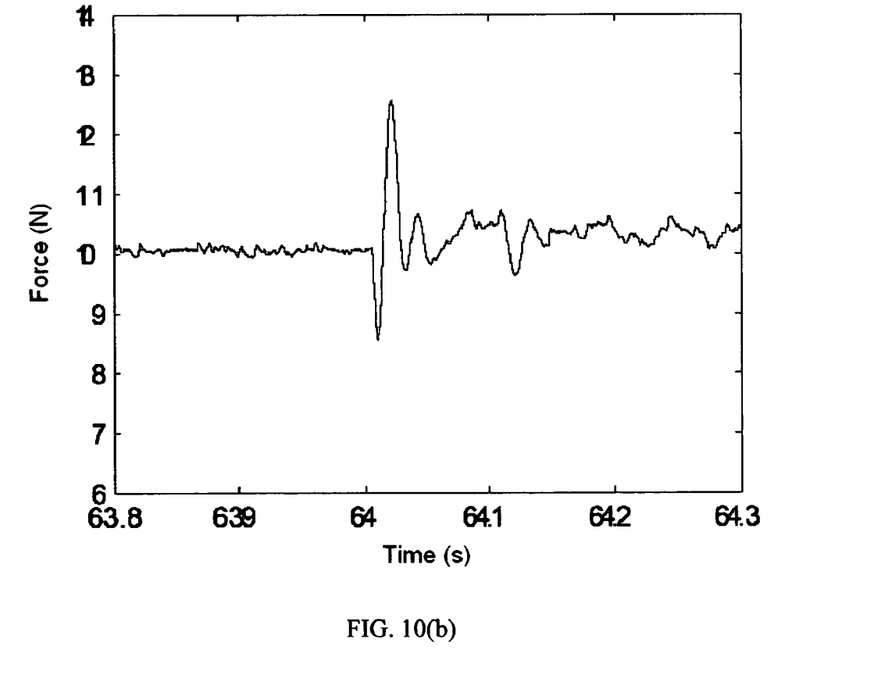
Figure 11A:
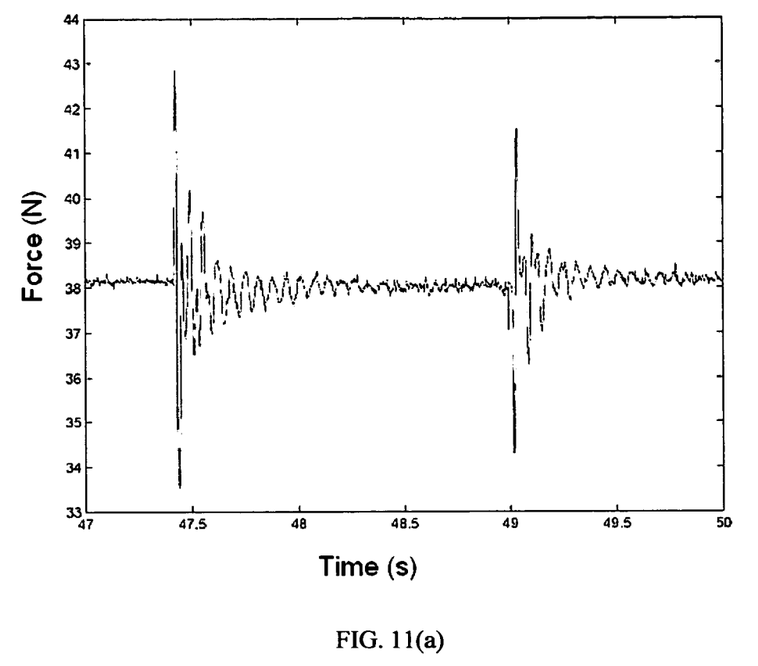
Figure 11B:
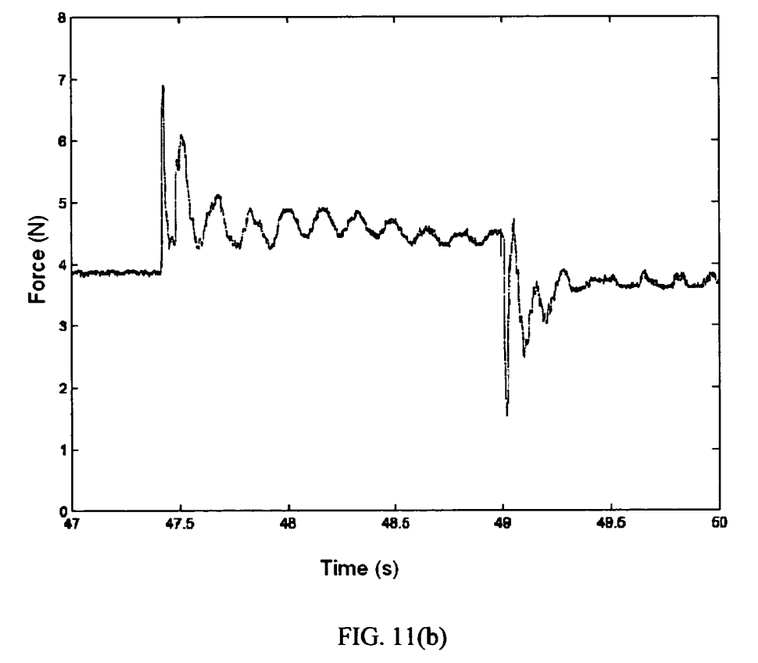

The normal force between the tether and the floor in a mass-pinning configuration is shown for valve closing and opening in FIGS. 10(a) and (b) for a weight of 10 N and a tension of 4.9 N. Note the increase and then decrease in normal force associated with closing the valve and the reverse for opening the valve. Among other things, the initial increase in pressure due to the valve closure causes the hose to expand, momentarily increasing the normal force. As the pressure returns to the steady state value, the tether contracts reducing the normal force. For a weight of 10 N, the normal force reduces to 7.14 N on valve closing, a 29% decrease. The normal and tangential force measurements for a weight of 38 N are shown in FIGS. 11(a) and (b), respectively. For a weight of 38 N, the normal force reduces to 33.5 N for valve closing, a decrease of 12%. As the valve closes the tangential force increases in the direction of forward motion. The reduction in normal force accompanied by an increase in the forward tangential force, may contribute to or result in incremental motion of the platform with a sufficient applied tension.

To further understand the effect of the waterhammer on allowing motion of a tethered robot, on may consider two cases: (1) a mass on the tether preventing motion; and (2) the tether caught on a corner. In both cases the pressure wave induced by the waterhammer must reduce the frictional force on the tether to allow for motion of the vehicle.

Figure 12A:
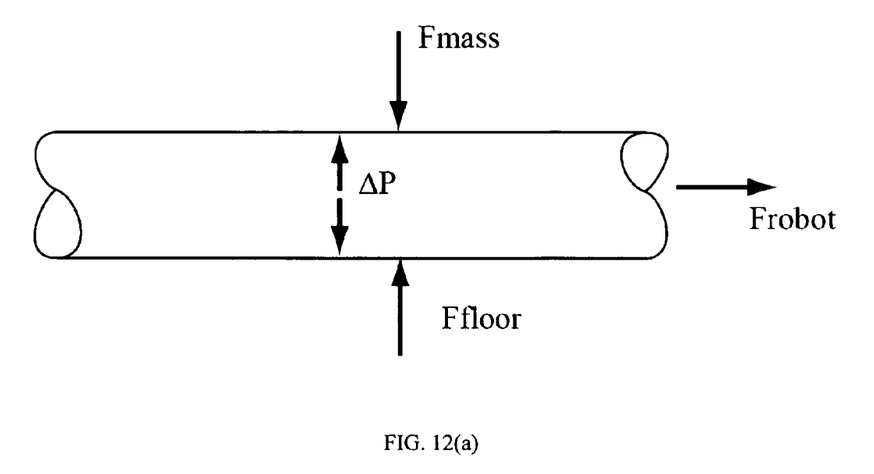
Figure 12B:
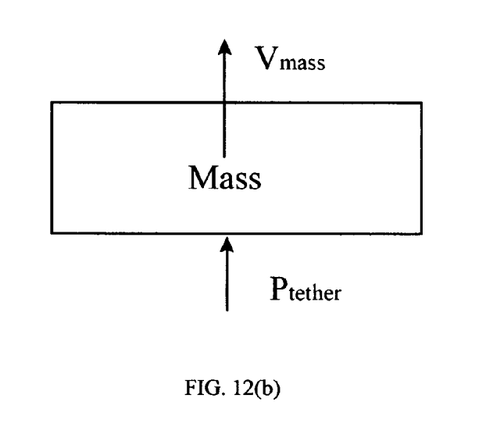

Now, the case of the mass pinning the tether is considered. The schematic of a mass on the tether is shown in FIG. 3 and free-body diagrams for the tether and the mass are shown in FIG. 12. One may hypothesize that the sudden increase in pressure due to the waterhammer wave will cause the hose to expand over a relatively small amount of time. As the pressure returns to the steady state level, the tether will contract, reducing the force the mass exerts on the tether. This is coupled with an increase in the tangential force in the forward direction. The reduction in normal force and increase in tangential force combine to allow incremental forward motion of the tether.

Now, the case of the tether caught on a corner is considered. The schematic for the situation where the tether is caught on a corner is shown in FIG. 2. For steady state operation, fluid flows from surface 220 to surface 210. When the valve (located past surface 2) is closed the waterhammer wave 230 travels in the direction 232 from surface 210 to surface 220, opposite the direction of fluid flow 240. As the waterhammer wave travels around the corner the hose must exert a force on the fluid to conserve linear momentum in the system. To estimate this force, one may perform a linear momentum balance on the hose wrapped around the corner. For simplicity, assume that the hose makes a 90° turn. First, perform a steady state balance when the waterhammer wave front is contained within the control volume. The system is not truly in steady state, and one cannot determine the time dependence of the force, but this analysis should provide a reasonable estimate for the order of magnitude of the maximum force.

The above examples assumed that the magnitude of the waterhammer wave is constant at the maximum value. This assumption is valid for instantaneous gate closures, but actual gate closures involve a finite amount of time. When the waterhammer wave reaches the end of the hose, which is maintained at constant pressure, the waterhammer wave will be reflected and a negative pressure wave will travel in the opposite direction. For slower gate closures, the change in pressure at a given position is the sum of the initial pressure wave from the valve and the negative pressure wave reflected from the reservoir.

As demonstrated in the above examples, pressure waves induced by a waterhammer effect in accordance with the present invention reduce the frictional force on the tether, thereby allowing for robot motion. The above examples have further demonstrated the ability of actuating a tether using a waterhammer in accordance with the present invention to overcome common obstacles in robotic exploration. A pulsing tether in accordance with the present invention is capable of overcoming locked conditions with a small robot. The present invention thereby increases the capabilities of rescue robots in several areas including maneuverability and range.

While the foregoing invention has been described in terms of its preferred embodiments, it should be understood that various modifications may be made thereto without departing from the spirit and scope of the invention as defined in the appended claims. It is intended that all such modifications fall within the scope of the appended claims.

What is claimed is:

1. A robot comprising:
    a body;
    a guiding mechanism;
    a tether comprising a conduit and a valve; wherein said conduit is connected to an inflow port in said valve and closing said valve while a fluid travels through said conduit produces a waterhammer effect; and
    a locomotion assembly comprising at least one of wheels, tank treads and legs.

2. A robot according to claim 1, wherein said tether further comprises a second conduit connected to an outflow port in said valve.

3. A robot according to claim 2, said tether farther comprising a means for reducing a reciprocal waterhammer effect connected between said outflow port in said valve and said outflow conduit.

4. A robot according to claim 2, farther comprising a means for reducing a reciprocal waterhammer effect connected to said second conduit.

5. A robot according to claim 4, wherein said means for reducing a reciprocal waterhammer effect comprises an accumulation tank.

6. A robot according to claim 4, wherein said means for reducing a reciprocal waterhammer effect comprises a damper.

7. A robot according to claim 4, wherein said means for reducing a reciprocal waterhammer effect comprises an air bleed valve.

8. A robot according to claim 1, wherein said fluid comprises at least one of water, oil, hydraulic fluid, and air.

9. A robot according to claim 1, wherein said tether system further comprises a means for an operator to communicate with said robot.

10. A robot according to claim 1, wherein said valve is mounted to said body.

11. A robot comprising:
    a body;
    a guiding mechanism;
    a tether comprising a conduit and a valve; wherein said conduit is connected to an inflow port in said valve and closing said valve while a fluid travels through said conduit produces a waterhammer effect; and
    a serpentine locomotion system.

12. A robot according to claim 11, wherein said guiding mechanism and said serpentine locomotion system are integral with one another.

13. A robot comprising:
    a body;
    a guiding mechanism; and
    a tether comprising a conduit and a valve; wherein said conduit is connected to an inflow port in said valve and closing said valve while a fluid travels through said conduit produces a waterhammer effect;
    wherein said valve has an inflow side and an outflow side, said inflow conduit being located on the inflow side of said valve, and a bleed valve being located on said outflow side of said valve.

14. A robot comprising:
    a body;
    a guiding mechanism; and
    a tether comprising a conduit and a valve; wherein said conduit is connected to an inflow port in said valve and closing said valve while a fluid travels through said conduit produces a waterhammer effect;
    wherein said valve comprises a solenoid valve.

15. A robot comprising:
    a body;
    a guiding mechanism; and
    a tether comprising a conduit and a valve; wherein said conduit is connected to an inflow port in said valve and closing said valve while a fluid travels through said conduit produces a waterhammer effect; wherein said tether further comprises a communications cable.

16. A robot according to claim 15, further comprising a controller connected to an end of said tether opposite an end of said tether connected to said robot.

17. A robot according to claim 16, wherein said valve is controllable from said controller.

18. A robot comprising:
    a body; and
    a tether; wherein said tether comprises a conduit and a plurality of valves placed along said hose;
    wherein closing of at least one of said valves while a fluid travels through said hose produces a momentum transfer in said tether.

19. A robot according to claim 18, further comprising means for pulsing said plurality of valves between open and closed positions to cause movement of said tether.

20. A robot according to claim 18, wherein said closing of at least one of said valve produced a change in diameter of at least a portion of said conduit.

21. A robot according to claim 18, wherein said conduit comprises a hose.

22. A robot comprising:
  a body;
  a tether; wherein said tether comprises a conduit and a plurality of valves placed along said conduit; wherein closing of at least one of said valves while a fluid travels through said conduit produces a pressure change causing momentary changes in the dimensions of the tether.

23. A robot according to claim 22, wherein said momentary changes in dimensions comprises a change in diameter of at least a portion of said tether.

24. A robot according to claim 22, wherein said momentary changes in dimensions comprises a change in a length of at least a portion of said tether.

* * * * *

UNITED STATES PATENT AND TRADEMARK OFFICE
CERTIFICATE OF CORRECTION

PATENT NO. : 7,255,192 B2
APPLICATION NO. : 10/973622
DATED : August 14, 2007
INVENTOR(S) : Douglas P. Perrin and Robert D. Howe Page 1 of 1

It is certified that error appears in the above-identified patent and that said Letters Patent is hereby corrected as shown below:

Replace paragraph [0002] of the Specification with the following:

"This invention was made with government support under ISS-9988575 awarded by The National Science Foundation and under N00014-98-1-0669 awarded by the office of Naval Research. The government has certain rights in the invention."

Signed and Sealed this
Twenty-eighth Day of June, 2016

Michelle K. Lee
*Director of the United States Patent and Trademark Office*